United States Patent [19]

Blanchard et al.

[11] Patent Number: 5,352,646
[45] Date of Patent: * Oct. 4, 1994

[54] SUPPORTED CATALYSTS

[75] Inventors: Gilbert Blanchard, Le Plessis Belleville; Thierry Chopin, Saint Denis, both of France

[73] Assignee: Rhone-Poulenc Chimie, Courbevoie Cedex, France

[*] Notice: The portion of the term of this patent subsequent to Aug. 3, 2010 has been disclaimed.

[21] Appl. No.: 2,670

[22] Filed: Jan. 11, 1993

Related U.S. Application Data

[63] Continuation of Ser. No. 831,546, Feb. 5, 1992, Pat. No. 5,232,889, which is a continuation of Ser. No. 618,636, Nov. 27, 1990, abandoned.

[30] Foreign Application Priority Data

Nov. 27, 1989 [FR] France .............................. 89 15542

[51] Int. Cl.$^5$ .............................................. B01J 21/08
[52] U.S. Cl. .................................. 502/263; 502/300; 502/304
[58] Field of Search ....................... 502/263, 300, 304

[56] References Cited

U.S. PATENT DOCUMENTS

| | | | |
|---|---|---|---|
| 2,606,159 | 8/1952 | Owen | 252/155 |
| 2,695,893 | 11/1954 | Houdry | 252/451 |
| 4,020,012 | 4/1977 | Miura et al. | 252/441 |
| 4,119,571 | 10/1978 | Hegedus | 502/333 |
| 4,136,063 | 1/1979 | Kimura et al. | 252/466 J |
| 4,465,789 | 8/1984 | Lindsley | 502/255 |

FOREIGN PATENT DOCUMENTS 361952  4/1990  European Pat. Off. .
1004588  3/1952  France .

*Primary Examiner*—Helen M. S. Sneed
*Assistant Examiner*—E. D. Irzinski
*Attorney, Agent, or Firm*—Burns, Doane, Swecker & Mathis

[57] ABSTRACT

Novel supported catalysts, well adapted for the catalytic conversion of exhaust gases emanating from internal combustion engines, include a porous carrier material, e.g., alumina spheres, such porous carrier material having a catalytically effective amount of at least one non-platinum group catalytically active element, e.g., cerium, essentially homogeneously concentrated throughout the depth of a defined peripheral face surface layer (outer band or ring) thereof.

11 Claims, No Drawings

SUPPORTED CATALYSTS

This application is a continuation, of application Ser. No. 07/813,546, filed Feb. 5, 1992 and now U.S. Pat. No. 5,232,889 which is a continuation of application Ser. No. 07/618,636, filed Nov. 27, 1990 and now abandoned.

BACKGROUND OF THE INVENTION

1. Field of the Invention

The present invention relates to novel supported catalysts and to a process for the production thereof.

By "supported catalyst" is intended a catalyst of porous material, having catalytically active elements deposited onto the surface thereof, particularly by an impregnation process.

This invention especially relates to supported catalysts having at least one catalytically active element deposited onto a portion of a carrier therefor, namely, onto the peripheral outer layer (band or ring) of the carrier (support).

2. Description of the Prior Art

Supported catalysts have long been known to this art and they are useful in many processes, such as treating petroleum cuts or treating effluents, e.g., catalytically converting the exhaust gases emanating from internal combustion engines.

The catalysts typically comprise a carrier produced by shaping a porous material such as alumina. Thus, the carrier may assume various shapes, such as spheres, cylindrical extrusions or extrusions having a polylobal cross-section or a cross-section of various shapes, such as a wheel.

The porous materials generally used are alumina, silica, resin, zeolites or the like.

These carriers generally have a large specific surface area, e.g., over 20 $m^2/g$, to provide a large area which is rendered catalytically active by depositing catalytically active elements thereon.

The catalytically active elements may be grouped into several categories:

(i) catalytically active elements proper; these are typically elements of the platinum group of the Periodic Table, such as palladium, rhodium and the like, (ii) promoting elements therefor, which promote or enhance the catalytic activity of the above elements.

Currently, various elements are typically impregnated onto the entire surface area of the carrier, except for the elements of the platinum group and more specifically the element platinum. It is not possible to control the depth to which the element penetrates into the carrier, or the concentration of that element in each part of the area.

In view of the speed at which the reagents are diffused into the catalyst, it is known to this art that only a peripheral part of the catalyst is effective. Consequently, only a fraction of the elements deposited will actually be catalytically effective.

The catalytically active elements are typically very expensive materials and significantly affect the cost of carrying out a given catalytic process. Attempts have therefore long been made to reduce the amount of catalytically active elements in catalysts, while maintaining a level of catalytic activity which is high and at least equivalent.

One solution to the above problem is described in U.S. Pat. No. 3,674,680 to Hoesktra et al.

This solution entails forming the carrier or catalyst into special shapes, such as to provide a catalyst of a thickness which is no more than twice the thickness of the diffusion layer of the reagents. Thus, the greater part of the catalyst is in contact with the reagents.

However, this limitation on thickness makes it necessary to have complex shapes, resulting in catalysts which are brittle and expensive to produce.

A method has also been proposed to this art for impregnating metals of the platinum group, enabling the impregnation to be carried out solely within a sheath about the periphery of the carrier. The process uses a solution of platinum salt. However, it cannot be adapted to deposit other elements, e.g., transition metals or rare earths.

SUMMARY OF THE INVENTION

Accordingly, a major object of the present invention is the provision of a method of impregnating elements other than elements of the platinum group over a band of well defined thickness at the periphery of a carrier.

Another object of the present invention is the provision of novel catalysts which have a homogeneous content of catalytically active elements over a band or ring at the periphery of the carrier.

Briefly, the present invention features novel catalysts comprising a carrier formed by shaping a porous support material, over the surface of which catalytically active elements have been deposited, and wherein at least one of said catalytically active elements, other than an element of the platinum group, is deposited in a homogeneous concentration over a band or ring at the periphery of the carrier, the band having a well defined width.

DETAILED DESCRIPTION OF THE PREFERRED EMBODIMENTS OF THE INVENTION

More particularly according to the present invention, it is advantageous for the width of the peripheral ring to be substantially equal to the depth to which the reagents are diffused into the catalyst under consideration.

Thus, all or nearly all of the catalytically active elements are in contact with the reagents. This makes it possible to obtain catalytic activity at least equivalent to that of a conventional catalyst, with a far lower amount of catalytically active elements.

In a preferred embodiment of the invention, the width of the peripheral ring is constant.

In addition, the porous material constituting the carrier has active surface locations. Most porous materials used to form catalyst carriers are mineral oxides, which tend to polarize and become electrically charged when suspended in an aqueous solution. This is explained in an article by J. P. Brunelle, "preparation of catalysts by Adsorption of metal complexes on mineral oxides" published in *Fine. Appl. Chem*, 50, 9–10 (1978), p 211 ff.

Thus, most mineral oxides are amphoteric, namely, the reactive surface locations can react equally well with electronegative compounds (anions) and with electropositive compounds (cations).

The pH for which electrical neutrality of the surface is obtained corresponds to the isoelectric point of the material.

The amphoteric, acid or basic character will be more or less strong, according to how high the concentration of reactive locations is as one departs from the isoelectric point of the material.

Exemplary mineral oxides of an amphoteric character are alumina, titanium dioxide, zirconium oxide and cerium oxide. Zinc and magnesium oxide have a basic character. Silica also has an amphoteric character, but it is not very strong.

Carriers suitable for the invention, therefore, are those produced from a porous material that is amphoteric, acid or basic in nature.

However, the support materials suitable for the invention must also be capable of being shaped by any known process, such as extrusion, molding, granulation or the like.

Mineral oxides may of course be used, either alone or in mixtures, and may contain additives such as stabilizing agents.

The catalyst of the invention is produced by impregnating the carrier with a colloidal solution of a compound of the element to be deposited, also designated a "sol". A sol is, in fact, a metastable equilibrium which can be destroyed by changing the pH. Thus, when the sol penetrates into the pores of the carrier, the reactive surface locations therein change the pH of the sol, causing the element to be deposited, while the liquid phase of the sol continues to be diffused towards the center of the carrier.

As the diffusion speed is constant throughout the carrier and the concentration of reactive locations in the carrier is homogeneous, the sol will be neutralized at a surface with a profile parallel and identical with that of the outer face surface of the carrier.

However, if the elements are to penetrate into the pores of the carrier, the dimensions of the colloids constituting the sol must be smaller than the diameter of the pores of the carrier, and particularly smaller than the micropores, which comprise the greater portion of the surface.

The width of the peripheral layer in which the catalytically active element is deposited is determined and controlled by the pH of the sol with which it is impregnated.

As regards the amount of the element deposited, this is controlled by the concentration of that element in the sol.

For example, for a carrier constituted of alumina, the micropores of which are generally smaller than 1,000 Å in diameter and preferably smaller than 100 Å, suitable sols are those comprising colloids having a dimension smaller than 1,000 Å, and preferably smaller than 100 A, e.g., on the order of 80 Å or less. Sols of cerium oxide which contain colloids on the order of 60 Å are perfectly suitable. These permit the production of alumina based catalyst containing cerium values which are deposited only within a layer located at the outer face surface or periphery of the carrier.

The concentration of the catalytically active elements in the peripheral ring is not critical and is determined according to the element deposited and the catalyst required.

The concentration of the above element in the remainder of the volume of the carrier is advantageously close or equal to zero.

The carrier may be impregnated by any known method. However, the dry impregnation method is preferred, since it gives better control of the width of the impregnated ring.

By "pore impregnation" is intended impregnation of a porous carrier with a volume of solution of sol substantially equal to the pore volume of the carrier.

The carrier thus impregnated is dried, then heat-treated to activate the catalyst.

Exemplary colloidal solutions of a cerium compound are colloidal solutions of cerium hydroxide, cerium hydroxy nitrate, or any other compound which can be decomposed to ceric oxide by heat treatment.

The concentration of cerium (expressed as cerium oxide) in the colloidal impregnating solution is not critical; it depends on the amount of cerium required in the catalyst. In a preferred embodiment of the invention, however, this concentration ranges from 20 to 400 g/l (expressed as $CeO_2$).

The pH of the solution is also not critical. It is selected according to the stability of the sols used and the acid or basic character of the carrier to be impregnated. Thus, for an alumina carrier, the pH of the colloidal cerium solution will advantageously range from 0.2 to 2.

It is possible to deposit other catalytically active elements onto the carrier by conventional impregnation with solutions of salts, which can then be decomposed to oxides by appropriate heat treatment.

The catalysts of the invention are useful for a wide variety of applications.

For example, the catalysts of the invention are well suited for treating the exhaust gases emanating from internal combustion engines. Thus, the catalysts described in European Patent No. 27,069 can be produced per the present invention. These contain iron and cerium as catalytically active elements, in addition to the precious metals of the platinum family typically used for such application. Cerium, which is quite expensive, is deposited solely within a band approximately 400 microns wide about the periphery of the carrier, corresponding to the diffusion layer of gases in the catalyst.

Thus, the cost of producing the catalyst is significantly reduced, while the catalytic properties are maintained at least at an equivalent level.

In order to further illustrate the present invention and the advantages thereof, the following specific examples are given, it being understood that same are intended only as illustrative and in nowise limitative.

EXAMPLE 1

100 g of alumina spheres of gamma structure were prepared by the techniques described in French Patents Nos. 1,449,904 and 1,386,364.

The spheres had a specific surface area of 100 m²/g and a total pore volume of 0.90 cm₃/g. The volume of micropores having a diameter greater than 1,000 Å was 0.20 cm³/g, and the mean diameter of the micropores was 200 Å.

A colloidal suspension of cerium hydroxide was also prepared, by the method described in European Patent No. 239,477.

This homodisperse suspension had the following properties:
 (a) concentration of $CeO_2$: 300 g/l
 (b) mean dimensions of colloids: 5 nm.

The colloidal suspension was diluted to provide a solution containing 52 g/l of $CeO_2$ at pH 1.

The 100 g of alumina were maintained in a state of rotation, for example in a rotating bowl, and 90 cm³ of the solution was sprayed onto same.

After 30 minutes of contact, the spheres were dried at 150° C., then calcined in air at 400° C. for 3 hours.

The carrier contained 4.7% by weight of cerium, expressed as Ce, relative to the total weight of the carrier.

All the cerium was contained in a peripheral layer 400 microns wide. The concentration of cerium in the layer was 10% by weight.

EXAMPLE 2

The procedure of Example 1 was repeated, except that the cerium solution was at pH 0.5 and the concentration thereof was 78.3g/l.

The alumina spheres had a specific surface area of 100 m$^2$/g and a total pore volume of 1.20 cm$^3$/g, of which 0.45 cm$^3$/g corresponded to the volume of micropores having a dimension greater than 1,000 Å. The mean diameter of the micropores, corresponding to a volume of 0.75 cm$^3$/g, was about 200 Å.

The volume of cerium solution sprayed was 120 cm$^3$.

The spheres were dried and calcined as in Example 1

The carrier contained 9.4% of cerium relative to the total weight of carrier, and all of the cerium was deposited as a surface layer 300 microns wide.

EXAMPLE 3 (Comparative)

100 g of alumina spheres having the properties of the spheres in Example 1 were impregnated with a 52 g/l aqueous solution (90 cm$^3$) of cerous nitrate, under the operating conditions described in Example 1.

The carrier thus obtained contained 4.7% by weight of Ce relative to the total weight of the carrier. However, as indicated in the Table below, the cerium was deposited within the entire volume of the carrier.

The various carriers were analyzed by X-ray fluorescence to determine the profile of the concentration of cerium throughout the thickness.

Alumina spheres 3.2 mm in diameter were selected for this purpose. Spheres constituting a statistically representative sample were divided into two equal parts, and the concentration of cerium from the periphery of the sphere to the center was determined by X-ray fluorescence, using an EDAX apparatus.

The results obtained are expressed by the mean weight percentage of cerium for each slice or band of carrier. They are reported in the Table below:

The process of this invention is particularly suitable for this purpose.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A supported catalyst comprising an entirely porous carrier material, said porous carrier material having a catalytically effective amount of at least one catalytically active element essentially homogeneously concentrated throughout a peripheral face surface layer thereof, said at least one catalytically active element comprising cerium and said surface layer having a depth equal to a depth to which reagents are diffused into the catalyst during catalytic conversion thereof by the catalyst.

2. The supported catalyst as defined by claim 1, the width of said peripheral face surface layer being essentially constant.

3. The supported catalyst as defined by claim 1, said porous carrier material having active surface sites.

4. The supported catalyst as defined by claim 1, said porous carrier material comprising an acidic, basic or amphoteric inorganic oxide.

5. The supported catalyst as defined by claim 4, said porous carrier material comprising alumina, silica, titanium dioxide, zirconium oxide, cerium oxide or admixture thereof.

6. The supported catalyst as defined by claim 5, said porous support material comprising essentially spherical particulates.

7. The supported catalyst as defined by claim 1, comprising catalytically active elements impregnated over the entirety of the face surface of said porous carrier material.

8. The supported catalyst as defined by claim 1, further comprising a catalytically effective amount of a platinum group element concentrated within a peripheral face surface layer of said porous carrier material.

9. The supported catalyst as defined by claim 1, further comprising a catalyst promoter.

TABLE

| Band | Surface → center | | | | | | |
|---|---|---|---|---|---|---|---|
| Example | 0–100 μm | 100–200 μm | 200–300 μm | 300–400 μm | 400–500 μm | 500–1,600 μm | Total |
| 1 | 8.6% | 9.6 | 9.8 | 9.0 | 0.1 | 0 | 4.7 |
| 2 | 28.1% | 28.3 | 28.2 | 0.1 | 0 | 0 | 9.4 |
| 3 | 4.5% | 4.6 | 4.7 | 4.8 | 4.8 | 4.8 | 4.7 |

The above results clearly show the advantage of the carriers according to the invention and of the impregnating technique which permits the cerium to be deposited solely in a peripheral layer of the carrier.

Other active elements such as other promoters, for example iron or metals of the platinum family, may of course be impregnated onto the support before or after the depositing of the primary element, either onto the entirety of the carrier or solely onto a peripheral ring.

10. The supported catalyst as defined by claim 1, wherein the concentration of said at least one catalytically active element, within the volume of said porous carrier material other than said peripheral face surface layer, is essentially zero.

11. The supported catalyst as defined by claim 1, said peripheral face surface layer being about 400 microns wide.

* * * * *